Dec. 21, 1965      E. L. CHADWICK      3,224,018
DEVICE FOR KITCHEN TOOLS AND THE LIKE
Filed Feb. 28, 1962      4 Sheets-Sheet 1

Earl L. Chadwick
INVENTOR.

BY Hayden + Kravel

ATTORNEYS

Dec. 21, 1965   E. L. CHADWICK   3,224,018
DEVICE FOR KITCHEN TOOLS AND THE LIKE
Filed Feb. 28, 1962   4 Sheets-Sheet 4

Earl L. Chadwick
INVENTOR.

BY Hayden & Prowell

ATTORNEYS

United States Patent Office 3,224,018
Patented Dec. 21, 1965

3,224,018
DEVICE FOR KITCHEN TOOLS AND THE LIKE
Earl L. Chadwick, P.O. Box 4100, Portland 8, Oreg.
Filed Feb. 28, 1962, Ser. No. 177,932
4 Claims. (Cl. 7—14.25)

This application is a continuation-in-part of my co-pending United States patent application Serial No. 32,264, filed May 27, 1960, now abandoned.

This invention relates to new and useful improvements in devices for kitchen tools and the like, and particularly devices for removing strips, sections, or other removable portions from containers and the like.

It is an object of this invention to provide new and improved devices for kitchen tools and the like, and particularly devices for removing strips, sections or other removable portions from containers and the like.

Another important object of this invention is to provide a new and improved device for stripping strips or sections from containers and the like, wherein means are provided for initially releasing the end of each strip or section prior to such stripping action.

A further object of this invention is to provide a new and improved device for kitchen tools and the like, wherein said device has means for releasably holding such tools, so that the same device may be used with different tools for various purposes, particularly kitchens.

Another object of this invention is to provide a new and improved device which is particularly suitable for removing strips from containers, wherein such device has means for releasably attaching a strip removing tool therewith and also means for ejecting the strip which is removed from the container without releasing said strip removing tool.

A further object of this invention is to provide a multi-purpose device which is adapted to be used for all or several of the following purposes: removing a strip or section from a container, puncturing a container, removing a bottle cap, and punching a hole in a container, whereby such device is of general utility, particularly in kitchens.

Still another object of this invention is to provide a new and improved device for puncturing a container and/or for removing a bottle cap wherein a double purchase on the container or bottle cap is provided to facilitate the use thereof.

Another object of this invention is to provide a new and improved device for stripping strips or sections from containers and the like wherein the device is provided with a handle which is pivotally connected therewith.

A particular object of this invention is to provide a new and improved device for rolling up a strip or section to remove same from a can or other container, wherein means are provided with the device for guiding the device along the edge of the can or container, and means are also provided for forcing the rolled up strip or section from the device without requiring the user to touch such rolled up strip or section whereby injury to the user is avoided even though the strip or section may have relatively sharp edges.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein.

In the drawings, the letter A designates generally the device of this invention. The device A includes a stripping means S, which is adapted to engage a strip, section or removable portion R on a container C so that as the stripping means S is rotated or moved, the removable portion R is stripped from the container C to open the container C or to render same capable of having the cover removed therefrom. A guide or holding means G is provided with the stripping means S for guiding the movement of the stripping means S to facilitate the stripping of the removable portion R from the container C. The means G is also adapted to be grasped by the user for ejecting a rolled up strip from the device A, as will be explained. A handle or drive means H is connected to the stripping means S for imparting rotation or movement to the stripping means S. Such handle means H may take numerous forms, as will be more fully explained, but preferably the handle H is provided with means for removing caps from bottles or other containers and also means for puncturing cans or other containers. The device of this invention is therefore preferably a multi-purpose device, as will be more fully explained.

Figure 1:
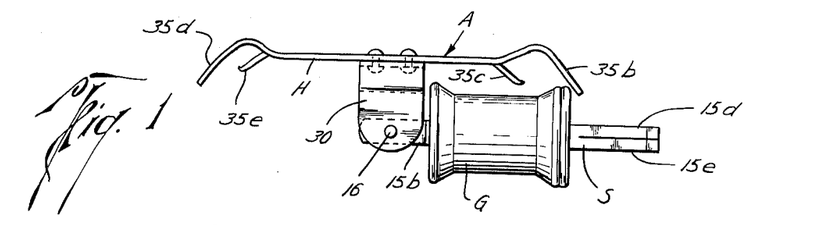
FIG. 1 is an elevation of the first form of the device of this invention, shown in the position for the use of the can puncturing means thereof.
Figure 2:
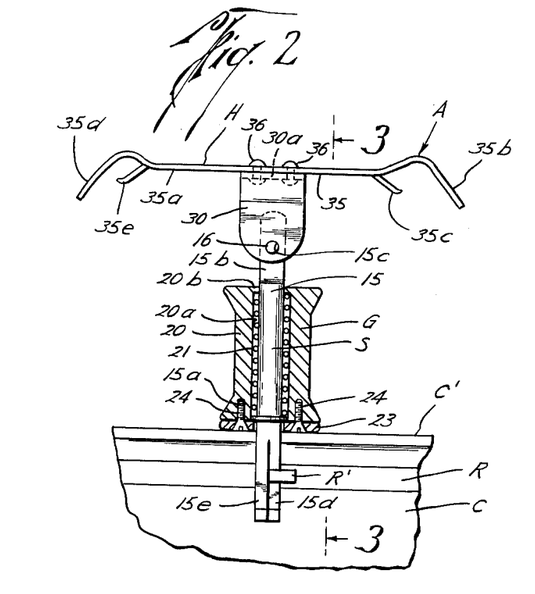
FIG. 2 is a view, partly in elevation and partly in section of the device shown in FIG. 1, but illustrating the device in the position for removing a strip, section or other removable portion from a can or container.
Figure 3:
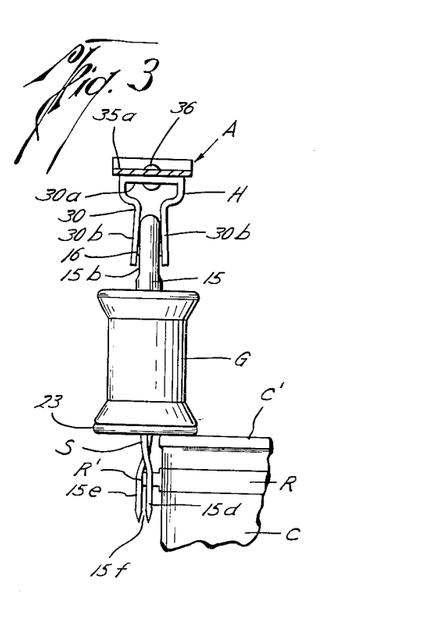
FIG. 3 is a side view taken on line 3—3 of FIG. 2.

Considering now the form of the invention shown in FIGS. 1–3 in particular, the stripping means S includes a shaft 15 which has an annular laterally extending flange 15a formed thereon. The cross-sectional area of the shaft 15 above the flange 15a in the form of the invention shown in FIGS. 1–3 is preferably round except at the upper end thereof where flattened sides 15b (FIG. 3) are provided. A hole 15c is provided through the upper end of the shaft 15 for receiving a pivot pin 16 for connecting the shaft 15 to the handle H as will be more fully explained.

At the lower end of the shaft 15, the stripping means S is formed with a pair of fingers or prongs 15d and 15e. Such fingers or prongs may be formed in several ways as will be explained hereinafter, but as shown in FIGS. 1–3, the right-hand finger or prong 15d (as viewed in FIG. 2) is displaced downwardly with respect to the left-hand finger or prong 15e. As viewed in FIG. 2, there is no lateral space between the fingers or prongs 15d and 15e, but because of the offset relationship of such fingers or prongs, there is a space 15f (FIG. 3) between such fingers or prongs which is of sufficient width to receive the end R' of the removable strip R on the container C shown in FIG. 2. Such removable strip R and the end R' shown in FIGS. 2 and 3 are representative of conventional strips which are presently used on cans such as cans used for coffee, shortening, peanuts and other items. When the strip R is stripped from the container C, the cover C' on the container may then be removed. It is to be noted that although the end R' of the removable strip R is normally close to the strip R when purchased from the store by the user, the end R' may be pulled outwardly with the device of this invention without the user manually engaging such end R' with his fingers because the lower ends of the fingers or prongs 15d and 15e are preferably pointed as best seen in FIG. 3 so that the lower edge of the finger or prong 15d is adapted to slide behind the end R' as shown in FIG. 2. Also, by reason of the pointed ends on the fingers or prongs 15d and 15e, the device of this invention may be used for punching a hole in a can such as a condensed milk can to form a pouring hole.

The guide means or holding means G shown in FIGS. 1–3 includes a cylindrical body 20 which has a hollow bore 20a therethrough. Such bore 20a is considerably larger in diameter than the external diameter of the shaft 15 so that an annular space is provided therebetween for receiving a resilient member such as a coil spring 21. The spring 21 rests against the shoulder 15a on the shaft 15 and also against an annular laterally extending shoulder 20b at or near the upper end of the body 20. The action of the spring 21 is to urge the body 20 upwardly with respect to the shaft 15, and such urging is limited by the engagement of a guide or wear ring 23 with the flange 15a. The body 20 is longitudinally movable downwardly on the shaft 15 so that the guide ring 23 engages a coiled or rolled up strip on the fingers 15d and 15e to eject the strip from such fingers without requiring the user to touch the strip with his or her fingers. The spring 21 acts to return the body to the normal use position (FIG. 2), and of course, it will be appreciated that such spring 21 or a similar resilient means may be provided externally of the body 20 rather than internally thereof for accomplishing the same purpose.

The guide or wear ring 23 is preferably formed of a relatively hard material such as carbide and it is secured to the lower part of the body 20 by means of screws 24 or any other suitable securing means. It is to be noted that the cylinder or body 20 and the parts connected therewith are free to rotate with respect to the shaft 15, and vice versa. Under normal conditions of use, the guide cylinder or body 20 is held against rotation by the fingers or hand of a user of the device A while the shaft 15 is rotated with respect to such body 20. The guide body or cylinder 20 functions to hold the shaft 15 substantially parallel to the surface of the container C from which the removable portion R is being stripped by the stripping means S.

Additionally, the wear plate 23 engages the container C along the upper edge thereof to guide the movement of the shaft 15 with respect to the container C. In actual use, as will be more evident hereinafter, upon a rotation of the shaft 15, the container C is actually rotated while the shaft 15 is being rotated so that the device A as a whole remains in one position. It should also be noted that the portion of the shaft 15 just below the guide ring 23 engages the external surface of the container C to facilitate the guiding of the device A as the shaft 15 is rotated, but such contact with the container C is only for a relatively limited period under normal conditions of use because the strip R when rolled upon the fingers or prongs 15d and 15e becomes of such diameter that it moves the shaft 15 outwardly away from the container C so that the shaft 15 no longer contacts the container C.

The handle means H shown in FIGS. 1–3 is merely illustrative of one type of handle means or drive means which may be used as a part of the device A of this invention. In the preferred form of the invention, the handle means or drive means H is connected to the shaft 15 above the guide means G so that the user may grasp the guide means G with one hand and the handle means H with the other hand, leaving the container C free to turn as the removable strip R is rolled up or wound upon the fingers or prongs 15d and 15e. The handle means H shown in FIGS. 1–3 includes a bracket 30 which includes a central bracket section 30a and side sections 30b. The side sctions 30b are formed with openings for receiving the pin 16 which extends through the opening 16c in the shaft 15, as previously explained. Such pin 16 is welded to the side sections 30b or it is flattened at its outer surfaces to hold the pin 16 in position to permit the movement of the shaft 15 with respect to such bracket 30 for swinging the handle means H from the position shown in FIG. 2 to the position shown in FIG. 1, and vice versa. In the form of the invention shown in FIGS. 1–3, the side sections 30b are bent outwardly at their bottom portions away from each other to provide a frictional contact between the upper end of the shaft 15 and the side sections 30b when the shaft 15 is substantially perpendicular to the handle means H as shown in FIG. 2. The frictional engagement between the side sections 30b and the upper end of the shaft 15 is shown in FIG. 3 and it serves to hold the handle H in the substantially horizontal position of FIGS. 2 and 3 even though the pivot pin 16 is loosely mounted in the opening 15c of the shaft 15.

The handle means H also includes an elongate member 35 which is preferably of substantially the same length as the shaft 15. Such elongate member 35 has a central flat section 35a which of course may take numerous shapes and configurations and which is secured to the bracket 30 by means of rivets 36 or any other suitable securing means. For rendering the device A of this invention a multi-purpose tool, the elongate element 35 has an extension 35b on one end thereof which is rounded for engaging a bottle cap or other cap on a bottle or container. While such extension 35b engages the upper surface of such cap (not shown), the lower edge of the cap is engaged by a projection 35c extending from the central portion 35a of the elongate member 35. Therefore, the extension 35b and the projection 35c together form a means for removing a cap such as a bottle cap from a bottle or other container.

At the other end of the elongate member 35b, another extension 35d is formed which is substantially V-shaped or pointed for serving as a means to puncture a can in the known manner. A projection 35e is also formed on the central portion 35a and depends therefrom for engaging the lower lip or surface of the lip of a can as the pointed extension 35d is forced into the can to cut or puncture a hole in the can.

In the use of the device A of this invention for the purpose of stripping a removable portion or strip R from a can or container C, as illustrated in FIGS. 2 and 3, the handle means H is positioned substantially perpendicular to the stripping means S. The user of the device A holds the handle means H in one hand and then, the end R' of the removable portion or strip R is pulled or moved outwardly away from the rest of the portion or strip R by prying with the sharp pointed end of the finger or prong 15d. The shaft 15 may then be lowered with the finger or prong 15d inside of the end R' and with the finger or prong 15e outwardly of the end R' as shown in FIGS. 2 and 3. The device A is lowered until the wear ring 23 on the guide means G is in engagement with the upper edge or lip of the container C. The user then grasps the body or cylinder 20 of the guide means G with one hand and the handle means H with the other hand. The handle means H is then turned or rotated to rotate the shaft 15 while the handle means G is held against rotation. As the shaft 15 is rotated, the removable strip R is wound or rolled upon the fingers or prongs 15d and 15e in a coil and the container or can C rotates or moves with respect to the device A during such stripping of the removable portion or strip R from the container or can C.

After the removable strip R is completely stripped from the container or can C, such removed strip R is then coiled upon the fingers or prongs 15d and 15e. Normally, the edges of such removed strip R are very sharp and jagged and therefore an attempt to slide the removed coiled or rolled up strip R from the fingers 15d and 15e is dangerous if the fingers of the user are used. The device A of this invention is provided with the body 20 for longitudinal movement relative to the shaft 15, as previously explained and therefore such body 20 serves to eject the coiled or rolled up portion R on the fingers 15d and 15e by moving the cylinder 20 downwardly with respect to the shaft 15. During such downward movement of the body 20 on the shaft 15, the spring 21 is compressed between the shoulder or surface 20b and the flange 15a so that after the rolled up strip R is ejected from the fingers 15d and 15e, the spring force of the spring 21 acts to return the body 20 to the raised position shown in FIG. 2.

When it is desired to use the device A of this invention for puncturing a can or other container with the pointed extension 35d, the guide means G is pivoted from the position shown in FIG. 2 to the position shown in FIG. 1. It is to be noted that the guide means G preferably is of such length and is so positioned on the shaft 15 that it fits between the bracket 30 and the extension 35b so as to form a compact assembly which fits into the palm of the hand of the user so that the extending end of the handle H which has the pointed portion 35d thereon is readily usable for puncturing the can or other container. When it is desired to use the other end of the handle H for removing bottle caps, the shaft 15 and the guide means G therewith are pivoted to the opposite position from that shown in FIG. 1 so that the guide means G is positioned between the bracket 30 and the extension 35d. Then, the device may be grasped in the palm of the hand of the user and the bottle cap or other cap may be removed by the usual procedure of contacting the curved extension 35b with the top of the cap and the projection 35c with the lower edge of the cap to apply a bending force to bend the edge of the cap and lift same from the bottle or other container. It is therefore apparent that the device of this invention is suitable for many purposes, particularly in connection with the normal needs around the kitchen.

Figures 4, 5, 6, 7:
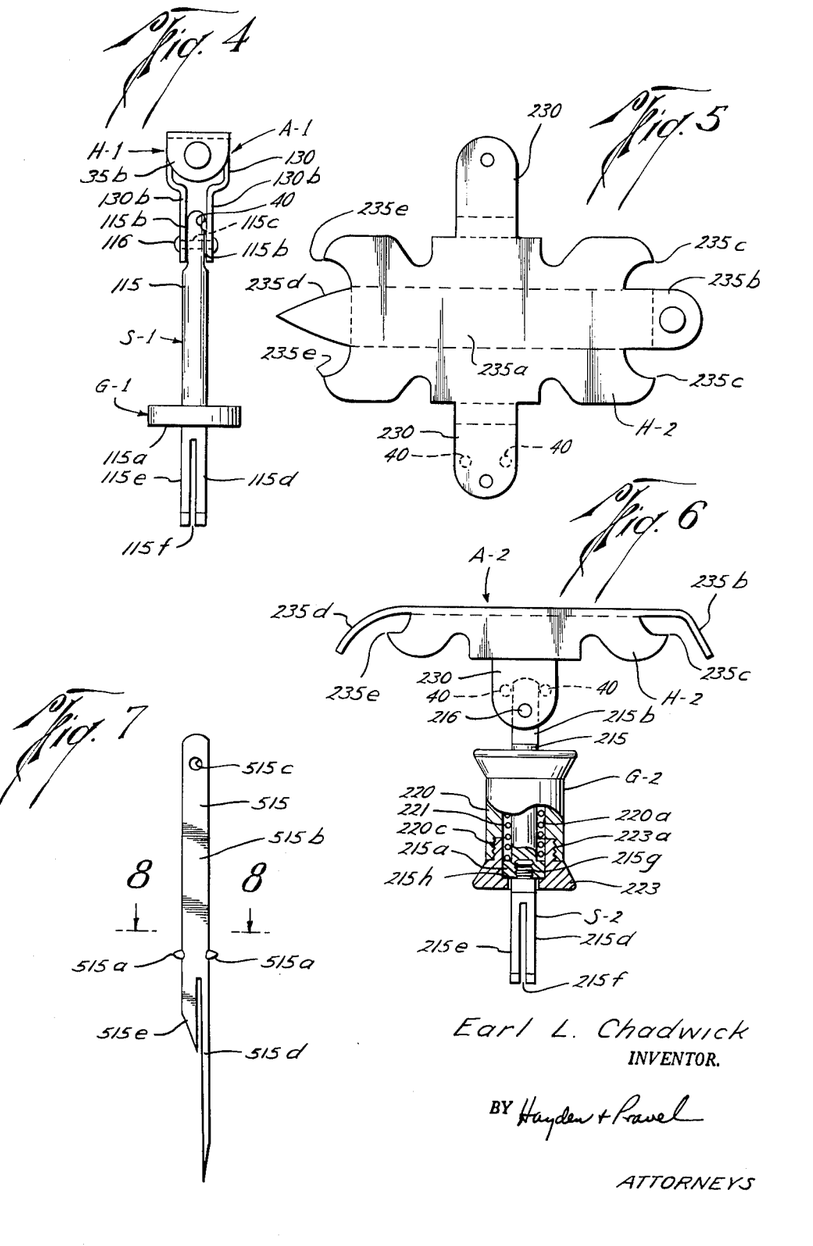
FIG. 4 is a side view of a second form of the device of this invention.
FIG. 5 is a plan view of a sheet of metal which has been cut or shaped prior to bending same to form the handle means for the device shown in FIG. 6.
FIG. 6 is a view, partly in elevation and partly in section, illustrating a third form of the device of this invention with the handle means of FIG. 5 shown therewith.
FIG. 7 is an elevation of one form of shaft or stripping member which is adapted to be used with the various forms of the device of this invention.

In FIG. 4 of the drawings, a modified form A-1 of the invention is shown which includes a stripping means S-1, a guide means G-1 and a handle means H-1. The stripping means S-1 includes a shaft 115 which is essentially the same as the shaft 15 of the device A except that the flange 115a is preferably heavier and of a greater lateral width than the flange 15a on the shaft 15. Such flange 115a actually serves as a guide means by contacting the surface of the container C in the same manner as the guide ring 23 contacts the surface of the container C in the device A. The fingers or prongs 115d and 115e are formed differently from the fingers or prongs 15d and 15e but they serve the same purpose. The prongs 115d and 115e lie in the same plane and a lateral space 115f is provided therebetween. It is to be noted that the space 115f is in the same plane with the fingers 115d and 115e rather than being in the space between the offset fingers 15d and 15e as in FIG. 3 of the drawings.

The upper end of the shaft 115 is provided with flattened surfaces 115b in the preferred form of the invention. A suitable opening 115c is also provided through the upper end of the shaft 115 for receiving a pivot pin 116. The handle H-1 in FIG. 4 is preferably a duplicate of the handle H in FIGS. 1–3 and the extension 35b is shown clearly in FIG. 4 from the end view thereof. The bracket 130 in FIG. 4 is substantially the same as the bracket 30 in FIGS. 1–3, except that the leg sections 130b are preferably substantially parallel to each other, and therefore, in order to hold the bracket 130 in a position with the handle means H-1 substantially perpendicular to the shaft 115, a pair of spaced convex humps 40 are provided on each side of the upper end of the shaft 115 above the pivot pin 116. Such humps are more clearly seen in the form of the invention shown in FIG. 6 which will be more fully explained hereinafter.

The device A-1 of FIG. 4 is used in a similar manner to that explained previously in connection with the form of the invention shown in FIGS. 1–3, except that the means for ejecting the wound or rolled up strip R after it has been removed from the container C is not provided with the form of the invention shown in FIG. 4.

In FIGS. 5 and 6, another modified form of the device A-2 is illustrated wherein the stripping means S-2, the guide means G-2, and the handle means H-2 are all provided corresponding with the stripping means S, the guide means G and the handle means H, respectively, in FIGS. 1–3. The stripping means S-2 includes a shaft 215 which corresponds with the shaft 15 except that the fingers 215d and 215e are formed as a removable bit or attachment with threads 215g being in threaded engagement with internal threads 215h on the upper part of the shaft 215 as seen in FIG. 6. The particular fingers 215d and 215e which are shown in FIG. 6 correspond with the fingers 115d and 115e of FIG. 4 in that the fingers 215d and 215e lie in the same plane and are provided with a lateral space 215f therebetween. However, the particular construction of the fingers 215d and 215e may be changed and in fact, a different bit or attachment with different finger constructions may be utilized. For example, another bit or attachment could be provided which has the fingers formed in the same fashion as the fingers 15d and 15e of FIGS. 1–3 wherein they are laterally offset as best seen in FIG. 3. Also, the detachable bit or attachment such as illustrated in FIG. 6 for the fingers 215d and 215e could be used with one of the fingers longer than the other as will be more fully explained hereinafter in connection with FIG. 7.

The annular flange 215a on the shaft 215 is substantially the same as the flange 15a on the shaft 15 except that it is illustrated as being slightly longer in order to provide additional metal for the internal threads 215h. Otherwise the shaft 215 is identical with the shaft 15 of FIGS. 1–3.

The guide means G-2 is basically the same as the guide means G of FIGS. 1–3 except that the wear ring 223 is formed with external threads 223a which are threaded into internal threads 220c at the lower end of the body 220. The bore 220a corresponds with the bore 20a and a spring 221 is positioned within the bore 220a in the same manner as the spring 21 is positioned in the bore 20a in FIGS. 1–3. Therefore, by longitudinally moving the guide means G-2 downwardly on the shaft 215, a coil or rolled up strip R from a container can be ejected from the fingers 215d and 215e and then the means G-2 will return to the position shown in FIG. 6 for subsequent use.

The handle means H–2 is modified as compared to the handle means H. It is preferably stamped or otherwise formed out of a single sheet of metal as shown in FIG. 5 wherein the handle means H–2 is shown prior to the bending of same along the dotted lines for forming the handle means H–2 into the form shown in FIG. 6 for attachment to the upper end of the shaft 215. The handle means H–2 is provided with a central section 235a with projections 235b and 235d on the ends thereof. The projection 235b corresponds with the projection 35b of FIGS. 1–4 and the projection 235d corresponds with the pointed projection 35d of the handle H of FIGS. 1–4. The handle H–2 has a pair of laterally spaced projections 235c which form spaced purchase points for engaging the lower edge of a bottle cap or the like in the usual manner for removing a bottle cap from a bottle or other container. The double purchase by reason of the double projections 235c improves the control and stability in the removal of the bottle caps. The handle H–2 also has a pair of spaced projections 235e which correspond with the projection 35e in FIGS. 1–4 and they serve to engage the lower surface of a lip on a container when the pointed projection 235d punctures the upper surface of a can or other container. Again, the double contact by the projections 235e is an advantage because of the greater leverage effect and contact area provided by such pair of projections 235e.

The handle H–2 has the extending tabs 230 which together form a bracket. In some instances, such tabs 230 may be omitted and instead a separate bracket such as the bracket 30 or the bracket 130 may be used by welding or riveting same to the central section 235a. At least one of the tabs or bracket sections 230 of the handle H–2 is provided with internally mounted or formed convex humps 40 which are spaced apart from each other a sufficient distance for receiving the upper end of the shaft 215 therebetween as best seen in FIG. 6. The shaft 215 is pivoted on any suitable pivot pin 216 which extends through an opening in the shaft 215 and openings in the bracket sections 230 and is mounted sufficiently loosely so that it can pass either of the humps 40 to enter the space therebetween for locking or holding the handle H–2 in the position substantially perpendicular to the shaft 215 (FIG. 6). However, such humps 40 should not be so large as to prevent the pivoting of the handle H–2 to a retracted position with the handle H–2 substantially parallel to the shaft 215 corresponding to that position shown for the device A in FIG. 1.

The device A–2 may be used in the same manner as previously explained in connection with the device A and of course the idea of the removable fingers may be employed in connection with the other devices or forms of the invention shown herein.

Figure 8:
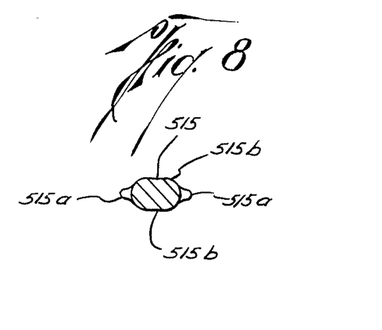
FIG. 8 is a cross-sectional view of the shaft or stripping member of FIG. 7 taken on line 8—8 of FIG. 7.

In FIGS. 7 and 8, a modified shaft 515 is shown which is formed of a metal bar or rod having the cross-sectional shape shown by the crosshatching in FIG. 8. Such construction differs from the shaft 15, 115, and 215 in that the cross-section is substantially the same throughout its length in the case of the shaft 515. Also, the shaft 515 is substantially elongated and has flat or flattened sides 515b throughout its length rather than just at the upper ends as in the shafts 15, 115 and 215. A hole 515c is provided for receiving a pivot pin such as the pin 16 in FIGS. 1–3. Instead of having a flange for the entire annular area of the shaft 515, a pair of projections may be forged or stamped as indicated at 515a in FIGS. 7 and 8 to serve for the same purpose as the flange 15a in FIGS. 1–3. The fingers 515d and 515c in FIG. 7 may be of the shapes previously described in connection with FIGS. 1–3 and FIGS. 4 and 6, but as shown in FIG. 7, the finger 515d is longer in length than the finger 515e. This particular finger construction is desirable in connection with the removal of removable sections such as are provided on sardine cans. In such case, the entire top surface of the can is removable and with the particular finger construction shown in FIG. 7, the long finger 515d is adapted to engage both of the upper edges of the can during the rolling up of the removable top section from the can. Of course, both of the fingers 515d and 515e may be elongated if desired. It will also be appreciated that the forms of the invention shown in FIGS. 1–3, 4 and 6 may be provided with one of the fingers longer than the other for use in connection with sardine cans and the like. It will also be evident hereinafter that these constructions may be employed in connection with the other forms of the invention shown in FIGS. 9–14 hereof.

Figures 9, 10, 11, 12, 13, 14:
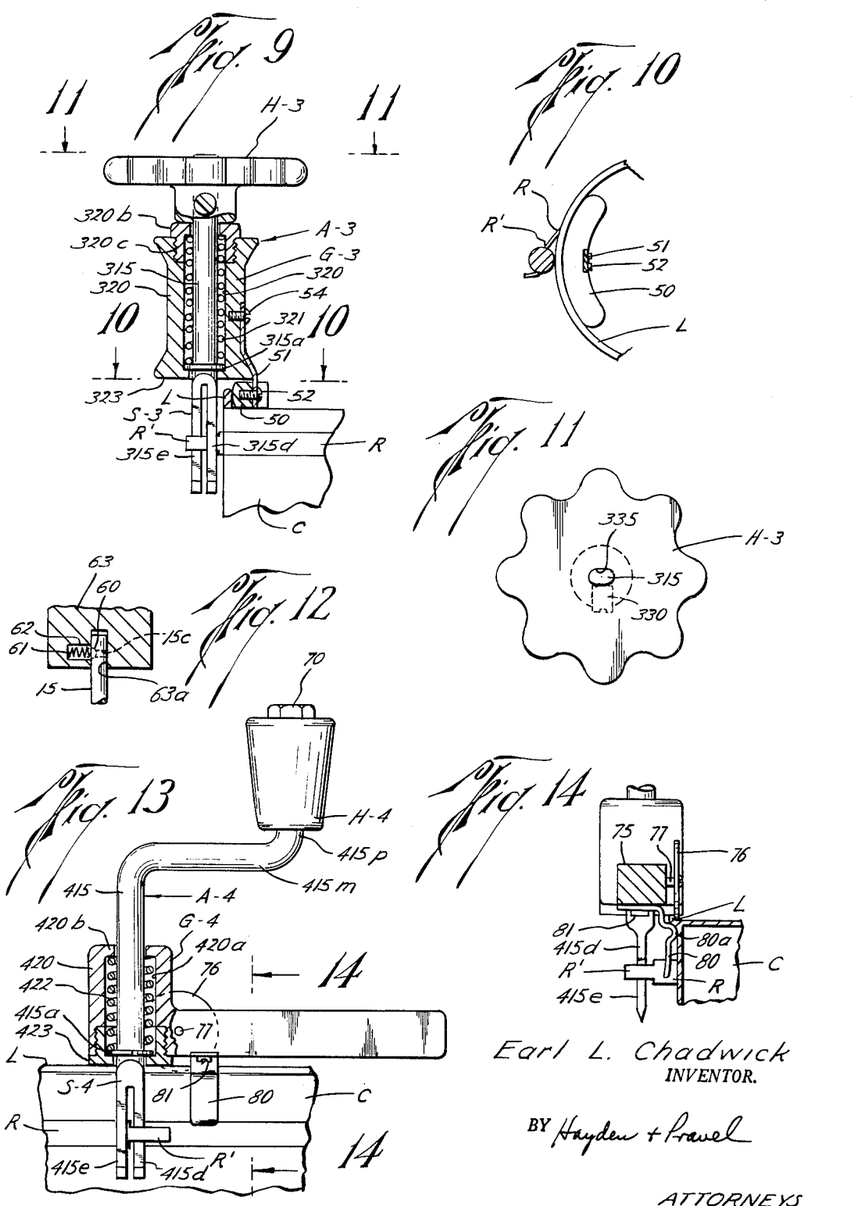
FIG. 9 is a view, partly in section and partly in elevation, illustrating a fourth form of the device of this invention.
FIG. 10 is a view taken on line 10—10 of FIG. 9 to further illustrate the form of the invention shown in FIG. 9.
FIG. 11 is a plan view taken on line 11—11 of FIG. 9 and it further illustrates the handle means used with the form of the invention shown in FIG. 9.
FIG. 12 is a view, partly in section and partly in elevation, showing a fragmentary portion of a drive means and the end of the shaft on the device of this invention inserted within such drive means for operating the device of this invention with a power source.
FIG. 13 is a view, partly in elevation and partly in section, illustrating a fifth form of the device of this invention in position for use on a container.
FIG. 14 is a view taken on line 14—14 of FIG. 13 and illustrates further details of the form of the invention shown in FIG. 13.

In FIGS. 9–11, another modified device A–3 is shown which includes a stripping means S–3, a guide means G–3 and a handle means H–3 which generally correspond with the stripping means S, the guide means G and the handle H, respectively, of FIGS. 1–3. The shaft 315 is substantially a duplicate of the shaft 15 except that the fingers 315d and 315e are formed in the manner described in connection with the fingers 115d and 115e, respectively, of FIG. 4. Also, the upper end of the shaft 315 is not necessarily provided with any opening for receiving a pivoted handle since the handle H–3 is not pivotable. The handle H–3 has a vertical opening 335 therein through which the upper end of the shaft 315 extends. A retaining screw 330 is threaded through the lower portion of the handle H–3 and engages with one of the longitudinal surfaces of the shaft 315 to hold the shaft and the handle H–3 together for permitting the shaft 315 to be rotated by means of the handle H–3.

The guide means G–3 is similar to the guide means G in that the cylindrical body 320 is provided with a central bore 320a which is spaced from the external surface of the shaft 315 for receiving a spring 321. The spring 321 acts against an annular flange 315a and a removable retaining sleeve 320b which is threaded into the body 320 at the threads 320c. Although the device A–3 may be used with the lower surface 323 engaging the upper surface of the container C similarly to the engagement of the ring 23 with the upper surface of the container C in FIG. 2, it may be desirable to provide an additional guide element 50 which is arcuate in shape (FIG. 10) and which is adapted to ride on the inside of a lip L on the upper edge of the container C. Such guide element 50 is connected to a resilient arm or leaf spring 51 by means of a screw 52 or other suitable attaching means. The upper end of the resilient arm or leaf spring 51 is connected to the body 320 by means of a screw 54 or any other suitable securing means. Preferably, the external surface of the body 320 is grooved or recessed sufficiently to receive the leaf spring 51 so that the external surface of the spring 51 is substantially flush with the external surface of the body 320. In any event, as the device A–3 is used, and as the removable strip R is wound up on the fingers 315d and 315e by a rotation of the shaft 315, the resiliency of the arm 351 permits the entire device A–3 to move laterally away from the container C, but without displacing the guide element 52 from its engagement with the inside of the lip L. The device A–3 otherwise functions substantially identically with the device A. It will of course be appreciated that the particular handle means H–3 shown in FIGS. 9–11 may be used with any of the other forms of this invention, and likewise, the handles H, H–1 and H–2 may be used with the form of the invention shown in FIGS. 9–11 if so desired. The same is true with respect to the particular construction of the fingers 315d and 315e since it is believed evident the other types of fingers heretofore described may be used with this form of the invention shown in FIGS. 9–11.

In FIG. 12, the upper end of the shaft 15 is illustrated wherein the hole 15c which is used for receiving the pivot pin 16 in FIGS. 1–3 is now used for receiving a locking ball 60. The locking ball 60 is resiliently urged towards the hole 15c by a spring 61 which fits within a recess 62 in the lower end of a chuck or movable head 63 on a power driven device. The ball 60 does not of course enter completely into the hole 15c but it enters sufficiently to prevent the shaft 15 from falling therefrom while permitting the shaft 15 to be withdrawn when desired. The upper end of the shaft 15 extends into a vertical hole for recess 63a on the end of the chuck or movable head 63 in order to become locked therein by the ball 60. In that manner, the stripping means S of FIGS. 1–3 may be driven by a motor or other power source (not shown) rather than being manually turned by the handle H. It will also be appreciated that such type of motor or other power source may be connected to any one of the shafts shown in any of the other forms of the invention, and that the type of connection shown in FIG. 12 is merely illustrative of various connection means which may be used for connecting the shaft 15 or any of the other shafts to a power source.

In FIGS. 13 and 14, a modified device A–4 is illustrated. Such device A–4 includes a stripping means S–4, a guide means G–4 and a handle or drive means H–4. The stripping means S–4 includes a shaft 415 which is generally cylindrical and which is provided with a flange 415a near its lower end corresponding to the flange 15a on the shaft 15. The fingers 415d and 415e correspond with the fingers 115d and 115e of FIG. 4 but of course, as previously explained such fingers 415d and 415e may be of the type shown in FIGS. 1–3 or of the type shown in FIG. 7. Also, the fingers 415d and 415e may be in the form of an attachment or a bit such as illustrated in FIG. 6.

The upper end of the shaft 415 is bent at a right angle to form a side extension 415m and a vertical extension 415p. The vertical extension 415p has the handle H–4 mounted rotatably thereon. Such handle H–4 is in the form of a tapered cylinder, preferably made of wood or plastic and it is retained in position on the shaft 415p by a retaining nut or other similar member 70. When the nut 70 is used, it is threaded to external threads provided on the upper end of the vertical section 415p of the shaft 415.

The guide means G–4 includes a cylindrical body 420 which corresponds with the cylindrical body 20 of FIGS. 1–3 and which is provided with an upper annular shoulder 420b for engagement by a spring 422 which is confined within the bore 420a of the body 420 in engagement with the flange 420b and the flange 415a. The guide means G–4 is therefore longitudinally movable with respect to the shaft 415 for ejecting the wound up strip R after it has been stripped from the container C.

The lower end of the body 420 is provided with a wear ring 423 which is threaded thereto or is otherwise suitably attached for limiting the upward movement of the cylinder 420 with respect to the shaft 415. Such ring 423 may be formed of a hard material such as carbide for the purpose of durability, as previously explained in connection with the wear ring 23 in FIGS. 1–3.

The cylinder or body 420 has a supplemental handle or guide member 75 formed therewith or suitably connected thereto. Such handle 75 is grasped by the user with one hand rather than grasping the cylinder 420 as would be the case if such handle 75 were not provided. Also, an additional guide wheel 76 is mounted on the guide means G–4 by means of an axle pin 77 which extends through the element 75. Such guide wheel 76 fits within the upper lip L of the container C from which the strip R is removed. Therefore, the guide wheel 76 serves to control the movement of the device A–4 as the strip R is unwound from the container C. The device is so constructed that the fingers 415d and 415e are spaced outwardly from the container C a sufficient distance so that even though the rolled up portion R on such fingers 415d and 415e gradually increases during the rotation of the shaft 415, there is adequate space to enable such increased rolled up strip R to collect on the fingers 415d and 415e without any lateral shifting of the device A–4. Therefore, the wheel 76 remains within the lip L during the entire strip removal.

A further means for maintaining the device A–4 in position during the stripping of the strip or portion R from the container C is provided in the form of a resilient spring element 80 which is secured to the lower part of the handle element 75 by a screw 81 or any other suitable attaching means. As best seen in FIG. 14, the resilient element 80 is formed with a curved section 80a which is adapted to fit below the lower surface of the lip L on the exterior thereof. Therefore, the resilient guide member 80 is positioned externally of the lip L while the guide wheel 76 is positioned internally of the lip L.

In the use of the device of the invention shown in FIGS. 13 and 14, the strip R is removed in the same manner as previously explained in connection with FIGS. 1–3, except that one hand is used for grasping the handle element 75 and the other hand is used for rotating the rotatable handle H–4 for imparting the rotation to the shaft 415. After the strip R has been removed from the container C, the handle 75 is pushed downwardly to thereby push the body or cylinder 420 downwardly with respect to the shaft 415 for compressing the spring 422 and for engaging the rolled up strip R on the fingers 415d and 415e to eject such rolled up strip R from such fingers. The spring 422 will of course return the cylinder 420 and the handle 75 therewith to the position shown in FIG. 13 after the force urging the cylinder 420 and the handle 75 downwardly is released. The device A–4 is then ready for use again.

Figures 15, 16, 17:
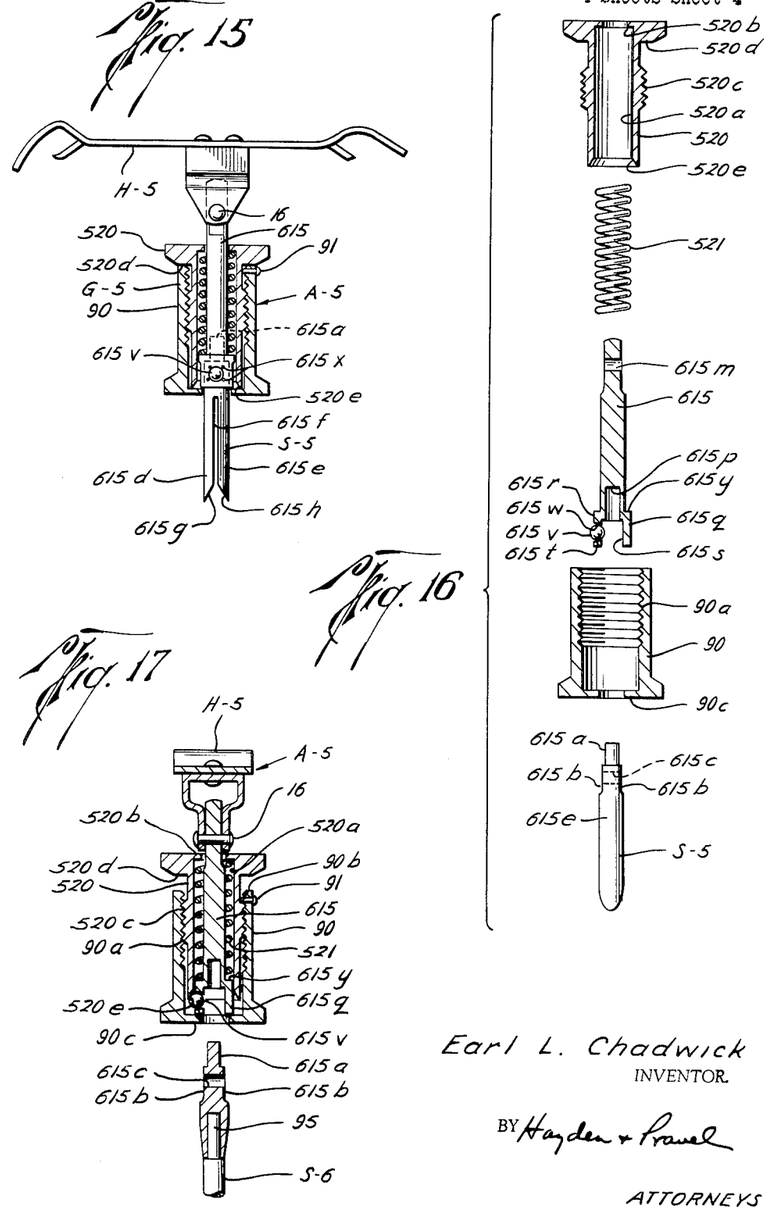
FIG. 15 is a view, partly in elevation and partly in section, illustrating a modified form of this invention which has a releasable tool therewith.
FIG. 16 is an exploded view of the form of the invention shown in FIG. 15.
FIG. 17 is a view similar to FIG. 15, but illustrating such modified device in a position for releasing the tool therefrom.

In FIGS. 15–17 of the drawings, a modified device A–5 is illustrated. Such device A–5 has a particular type of stripping means or tool S–5 as shown in FIGS. 15 and 16. In addition to being removable from the rest of the device A–5, the stripping means S–5 has a particular construction which is usable in place of the various other forms S–1 through S–4 of the stripping means as shown in the other drawings.

The stripping means or tool S–5 has a pair of fingers or prongs 615d and 615e. A longitudinal slot 615f is formed between the fingers or prongs 615d and 615e. In the usual course of manufacture of the stripping means S–5, the means S–5 is formed of a solid round bar of material which is sawed or otherwise cut down the center thereof to provide the slot 615f. As shown, the slot 615f does not go all of the way to the upper end of the tool S–5. It is also important to note that the inside lower tip 615g on the blade or prong 615d is tapered upwardly and inwardly towards the slot 615f. The finger or prong 615e has a similar upwardly and inwardly inclined inner surface 615h. With such construction, the lower pointed ends of each of the fingers or prongs 615d and 615e may be readily positioned for prying or separating the exposed end R′ (FIG. 2) from the strip to begin or initiate the stripping action. In other words, it is often difficult to get the free end R′ loose from the can to start the actual stripping with the various devices now known, but with the form of the invention shown in FIGS. 15–17, it has been found that such strip end R′ can be readily released for initiating the stripping action. The loose end R′, after being released by the pointed ends of the prongs or fingers 615d and 615e is of course positioned in the slot 615f for stripping action in the way described heretofore in connection with the other forms of the invention. It will therefore be understood that the particular construction of the stripping means or tool S–5 shown in particular in FIGS. 15 and 16 may be substituted for any of the other stripping means or tools S–1 through S–4, and in most cases the stripping means or tool S–5 is more desirable because of the advantage of releasing the exposed end R′ for unwinding. It will also be understood that the stripping means or tool S–5 may have one of its prongs 615d or 615e longer similar to the general configuration shown in FIG. 7.

The stripping means or tool S–5 is provided at its upper end with a pilot 615a. The tool S–5 preferably has one or more flat surfaces 615b and one or more holes 615c, the purpose of which will be more fully explained.

In the forms of the invention heretofore described in FIGS. 1–14, the strip removing means or tool is an integral member which extends from the lower prongs to the handle, but in the form of the invention shown in FIGS. 15–17, the shank 615 is separate from the tool S–5, but is adapted to be releasably attached thereto, as will be more fully explained. The upper end of the shank 615 is connected to the handle H–5 in the same manner as explained in connection with FIGS. 1–3 of the drawings. Thus, a bolt or pivot pin 16 extends through a suitable opening 615m in the upper end of the shank 615 so that the handle H–5 is adapted to pivot from the position shown in FIG. 1 to that shown in FIG. 2, as heretofore explained in connection with such figures.

The lower end of the shank 615 is formed in a particular manner as best illustrated in FIG. 16. Thus, the shank 615 is formed with a counterbore 615p which is adapted to receive the pilot 615a on the strip removing means or tool S–5. A pair of depending legs 615q and 615r are secured to the shank 615 or are formed integrally therewith, each of which has a flat internal surface, 615s and 615t, respectively, for engagement with the flats 615b on the tool S–5. One or more of the legs have a ball 615v mounted therein for lateral movement. As shown in FIGS. 15–17, the ball 615v is mounted in an opening 615w the walls of which are tapered outwardly from the flat inner surface 615t. Thus, the diameter of the hole 615w is larger on its outer portion than on the inner portion adjacent to the inner surface 615t. The ball 615v is of a sufficient diameter to prevent the ball from passing inwardly and falling out of the inner side of the hole 615w. In other words, the internal diameter of the hole 615w on its inner portion or side is slightly smaller than the diameter of the ball 615v, but the ball 615v can move outwardly away from the inner surface 615t due to the outward taper of the ball of the hole 615w. In order to prevent the ball 615v from completely falling out of the hole 615w, punch marks or stakes may be made to cause a depression in the outer surface of the leg 615r around the hole 615w, as indicated at 615x (FIG. 15). In any event, the ball 615v has a limited lateral movement so that it may move into the lateral space between the internal flat surfaces 615t and 615s, and it may also move outwardly from such lateral space to release the tool S–5, as will be more fully explained. It should also be noted that the ball 615v is adapted to enter the hole 615c to the extent that it prevents the tool S–5 from being inadvertently removed. However, the ball 615v is adapted to move outwardly out of the hole 615c when it is desired to remove the tool S–5 from the shank 615 and the rest of the device A–5, as will be more evident hereinafter.

The form of the invention shown in FIGS. 15–17 has a guide means or holding means G–5 which is formed in two principal parts, namely, a cylindrical body 520 and a rotatable release element 90. The body 520 is formed with a bore 520a which is adapted to receive a coil spring 521 or any other similar resilient means which is maintained under compression within the bore 520a so as to permit a longitudinal movement of the guide means or holding means G–5 with respect to the shank 615 and the tool S–5 by forcing the means G–5 downwardly with respect to the shank 615. Such compression action of the spring 521 is the same as heretofore described in connection with the spring 21 in FIG. 2 and is normally used for releasing a strip after it has been coiled up on the tool S–5.

It is to be noted that the spring 520a is confined between the shoulder 520b of the body 520 and an annular shoulder of similar projection 615y on the shank 615.

The body 520 has external threads 520c formed thereon which are adapted to engage with internal threads 90a on the sleeve 90. The sleeve 90 is thus adapted to be assembled on the body 520 by the threaded coaction between the threads 90a and 520c. In actual operation or use of the device A–5, the extent of rotation of the sleeve 90 is preferably limited by means of a stop screw 91 which extends through the sleeve 90 near it upper end and is adapted to engage a shoulder or thread 90b to limit the extent of the downward movement of the sleeve 90 with respect to the body 520. The upward movement of the sleeve 90 with respect to the body 520 is limited by the engagement of the upper end of the sleeve 90 with the outwardly extending flange 520d.

The lower end of the body 520 is formed with an upwardly and inwardly tapered surface 520e which is thus tapered to facilitate the forcing of the ball 615v inwardly as the cylinder 520 moves from the position shown in FIG. 17 to that shown in FIG. 15. When the internal bore 520a above the tapered portion 520e is in contact with the ball 615v, the ball 615v is held in a latched position extending into the lateral space between the leg 615r and the leg 615q to extend into the hole or similar impression or opening 615c, whereby the tool S–5 is held in a latched or connected position to the shank 615.

In the operation or use of the form of the device A–5 shown in FIGS. 15–17, the release cylinder or sleeve 90 is rotated from the position shown in FIG. 15 to that shown in FIG. 17 at which time the ball 615v is free to move outwardly to the extent indicated in FIG. 17 so that the pilot 615a and the upper portion including the flats 615b are adapted to move upwardly into the counterbore 615p and the lateral space between the legs 615q and 615r, respectively. The hole 615c is thus in alignment with the ball 615v and the flat surfaces 615b are in engagement with the flat inner surfaces 615s and 615t so that rotational movement of the member or tool S–5 with respect to the shank 615 is prevented.

Thereafter, the cylinder 90 is rotated so as to cause it to thread upwardly with respect to the body 520, and in doing so, the tapered inner surface 520e moves downwardly with respect to the ball 615v and forces it inwardly so that it enters the openings 615c. The ball 615v is in its maximum inward and latched position when the bore 520a is in engagement with the ball 615v, which occurs at least by the time the cylinder 90 has reached the position shown in FIG. 15. The tool S–5 is thus latched in position and is adapted to be rotated with the handle H–5 so that it may be used in the same manner as heretofore described for removing a strip R from a container C (FIG. 2). After the strip is removed and is coiled up around one of the projections or prongs 615d or 615e, it is readily removed without touching such rolled up strip by moving the entire holding means G–5 downwardly against the compression action of the spring 521.

If it is desired to replace the tool S–5, this is accomplished by a rotation of the sleeve 90 from the position shown in FIG. 15 to that shown in FIG. 17. During the rotation of the cylinder 90 from its telescoped position (FIG. 15) to its extended position (FIG. 17), the spring 521 maintains a constant upward force on the internal shoulder 520b which maintains the lower end 90c in constant engagement with the lower ends of the legs 615q and 615r. Such action results in the inner sleeve or body 520 moving upwardly with respect to the shank 615 so that the internal surface 520e moves upwardly in alignment with or above the ball 615d so that such ball may move outwardly to the position shown in FIG. 17 to effect or permit the release of the tool S–5.

It is to be noted that various types of detachable tools other than the strip removing means or tool S–5 may be used with the modified construction of FIGS. 15–17. Thus, in FIG. 17, a modified tool S–6 is partially shown to indicate that a screwdriver attachment, a hammer attachment, a tack puller, a socket wrench, a nut runner, and various other heads may be provided other than the prongs or projections 615d and 615e. The modified tool S–6 shown in FIG. 17 has the same upper end with the pilot 615a, the flat sides 615b and the hole 615c. However, the lower end 95 of the tool S–6 is solid and is either formed integrally wth the upper part of the tool or is welded or is otherwise affixed thereto. The lower end of the solid shank or rod 95 may terminate in an ordinary screwdriver head, an Allen screwdriver head, or any of the other types of heads previously referred to. It will also be understood that other types of heads or tools, even though not specifically mentioned, may be used within the scope of this invention at the lower end of the shank 95.

It is to be noted that instead of providing a hole 615c all of the way through the tools S–5 and S–6, a depression in one or all of the flats 615b may be employed. Also, an additional hole perpendicular to the hole 615c may be employed so that there will be a hole on all of the sides for receiving the ball 615v. In such case, there would normally be four flat sides 615b forming a square upper shank surface which extends into the space between the legs 615q and 615r. Other variations will of course occur to those skilled in the art and are within the scope of this invention.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A device for removing removable portions from containers and the like, comprising
(a) a tool having stripping means therewith for engaging a part of a removable portion of a container for effecting a removal thereof from the container upon a rotation of said means,
(b) a shaft above said tool,
(c) connection means releasably attaching said tool to said shaft,
(d) an ejecting member having a hollow bore through which said shaft extends,
(e) said ejecting member being longitudinally movable relative to said shaft for ejecting a stripped removable portion from said stripping means,
(f) said connection means including a release sleeve and a laterally movable projection adapted to be moved into and out of locking contact with said tool, and
(g) rotatable connecting means on said release sleeve and said ejecting member rotatably mounting said release sleeve as a part of said ejecting member for releasing and locking said tool by the inward and outward movement of said projection.

2. The structure set forth in claim 1, including:
(a) handle means, and
(b) pivotal connection means pivotally connecting said handle means to the other end of said shaft from said stripping means for pivotal movement from a position substantially perpendicular to said shaft to either side of said shaft.

3. The structure set forth in claim 1 including:
(a) bracket means pivotally connected to said shaft,
(b) pivotal connection means pivotally connecting said bracket means to the other end of said shaft from said stripping means for pivotal movement from a position substantially in axial alignment with said shaft to either side of said axis, and
(c) handle means having a tool on each end thereof and disposed substantially perpendicular to the bracket and secured thereto for pivotal movement with the bracket from a position perpendicular to the shaft to a position along either side of said shaft and substantially parallel thereto.

4. The structure set forth in claim 3 wherein said bracket means includes:
(a) a pair of resilient members which are spaced apart a distance less than the width of the shaft extending therebetween, and
(b) said resilient members being urged apart to provide a friction grip between the bracket and the shaft when the bracket is in alignment with the shaft.

References Cited by the Examiner

UNITED STATES PATENTS

| | | | |
|---|---|---|---|
| 152,960 | 7/1874 | Barker | 7—1 |
| 1,095,369 | 5/1914 | Arnold | 220—52 |
| 1,445,905 | 2/1923 | Neff. | |
| 2,679,272 | 5/1954 | Giannone. | |
| 2,736,458 | 2/1956 | Lines | 220—52 |
| 2,738,098 | 3/1956 | Reed | 220—52 |
| 2,767,879 | 10/1956 | Chades | 220—52 |
| 2,777,600 | 1/1957 | Woolfolk | 220—52 |
| 2,783,914 | 3/1957 | Brady | 220—52 |
| 2,797,842 | 7/1957 | Godlewski et al. | 220—52.6 |
| 2,829,797 | 4/1958 | Christopher | 220—52 |
| 2,919,049 | 12/1959 | Berry | 220—52 |
| 2,958,441 | 11/1960 | Teegardin | 220—52 |
| 2,973,115 | 2/1961 | Kabaci | 220—52 |

FOREIGN PATENTS

| | | |
|---|---|---|
| 540,453 | 4/1922 | France. |
| 692,515 | 6/1940 | Germany. |
| 256,465 | 8/1948 | Switzerland. |

THERON E. CONDON, *Primary Examiner.*

EARLE J. DRUMMOND, GEORGE O. RALSTON, LOUIS G. MANCENE, *Examiners.*